Patented Feb. 22, 1949

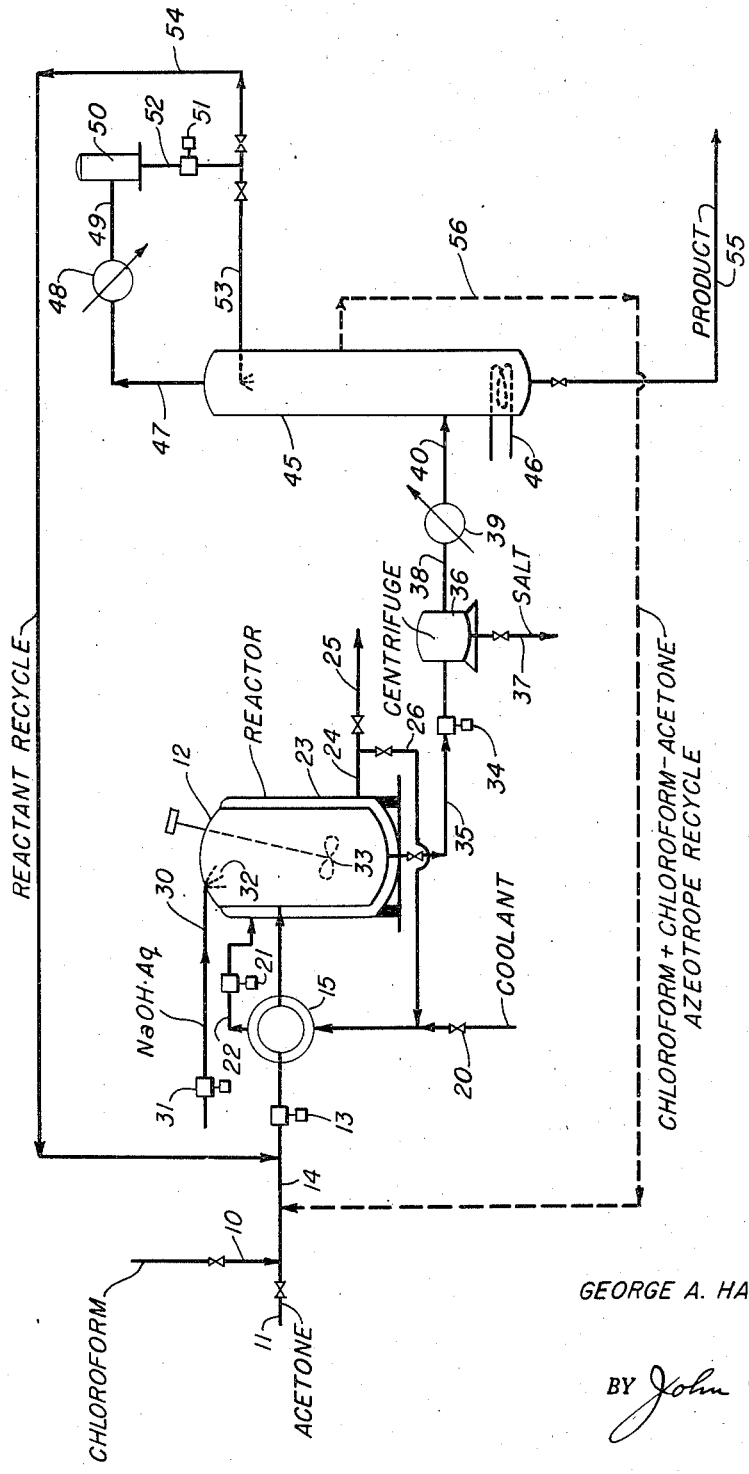

2,462,389

UNITED STATES PATENT OFFICE 2,462,389

MANUFACTURE OF CHLORETONE

George A. Harrington, New York, N. Y., assignor, by mesne assignments, to Socony-Vacuum Oil Company, Incorporated, New York, N. Y., a corporation of New York Application July 29, 1946, Serial No. 686,878

8 Claims. (Cl. 260—633)

This invention relates to a continuous process for the manufacture of hydrous chloretone, that is, 1,1,1-trichloro-tertiary butyl alcohol from acetone and chloroform. More particularly, this invention is concerned with an improved continuous method for condensing acetone and chloroform in the presence of low concentrations of alkali dissolved in water to produce relatively high yields of the hydrous chloretone. The term hydrous chloretone as used in the specification and claims refers to a form of chloretone having from about 0.20 to about 2.0 molecules of water so associated with the chloretone molecule that when the chloretone is in the molten state only one liquid phase is present in the material.

Chloroform is becoming available in ever increasing amounts, particularly as a byproduct in the chlorination of natural gas, and hence a potential outlet for large amounts of chloroform is highly essential from the economic standpoint for the successful production of such products as alkyl chlorides from natural gas. A potential use for chloroform in large amounts is the production of chloretone which may be converted to methacrylic acid as taught and claimed in the patent of G. A. Harrington and Everett Gorin, No. 2,438,164, dated March 23, 1948.

It is well known in the art to produce chloretone by condensing acetone and chloroform in the presence of such alkali materials as potassium hydroxide or sodium hydroxide. The alkali catalyst has been used in the dry anhydrous state, or dissolved in ethyl alcohol or water. Ethyl alcohol has been preferred as a solvent and concentrated aqueous solutions of caustic alkali have been reported to give low yields of chloretone. In general, the methods used heretofore have resulted in relatively low yields and have been adaptable to batch operation only.

An object of this invention is to provide a continuous process for the manufacture of hydrous chloretone. Another object of the invention is to produce the hydrous chloretone in relatively large yields from acetone and chloroform. Still another object of the invention is to produce hydrous chloretone under such conditions of temperature, catalyst concentration, and water content of the reaction mixture that a minimum amount of the chloretone product is reconverted to acetone, carbon monoxide, and the metallic chloride corresponding to the hydroxide catalyst used in promoting the reaction. Other objects will be apparent from the description of the invention.

The yield of chloretone where acetone is reacted with chloroform in the presence of caustic is in fact the net yield of two successive reactions represented by the following equations:

1. $CH_3COCH_3 + CHCl_3 + (MOH) \rightarrow$ 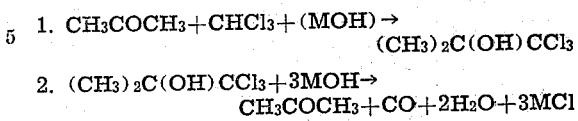
$(CH_3)_2C(OH)CCl_3$

2. $(CH_3)_2C(OH)CCl_3 + 3MOH \rightarrow$
$CH_3COCH_3 + CO + 2H_2O + 3MCl$

It is obvious that the yield of chloretone according to Equation 1 can be made favorable only if the hydrolysis of the chloretone product according to Equation 2 can be suppressed. I have found that this can be accomplished by simultaneously controlling three variables relative to conditions of operation. These variables are temperature, concentration of acetone in the reaction mixture, and concentration of potassium hydroxide or sodium hydroxide catalyst.

The rate of reaction as represented by Equation 1 is not greatly affected by temperature. On the other hand, the hydrolysis represented by Equation 2 is greatly retarded if the condensation reaction is carried out at temperatures below room temperature. I have found that when operating with aqueous solutions of caustic as catalyst, temperatures within the range of from about $+10°$ C. to $-40°$ C., preferably about $0°$ C. to about $-30°$ C., should be used to obtain at least 20 per cent conversion to chloretone product based on the chloroform charged, and at least 85 per cent and usually more than 90 per cent yield of chloretone product based on the chloroform consumed in the reaction. I have also found that a large excess of acetone in the reaction mixture increases the yield of chloretone product. An excess of acetone favors the reaction illustrated by Equation 1 as a result of the operation of the principle of mass action. The relative amounts of acetone and chloroform in the reaction mixture should be within the range of from about 3 to 8 mols of acetone to 1 mol of chloroform, preferably from about 4 to 6 mols of acetone per mol of chloroform.

Of the above variables the most important from the standpoint of obtaining high yields of chloretone product on the basis of chloroform consumed is the amount of sodium hydroxide or potassium hydroxide added to the reaction mixture and the physical state in which the caustic is added. These factors have not been fully appreciated by former investigators. This is particularly true where solid metallic hydroxide is used as a catalyst. In this instance the metallic chloride formed by the decomposition of chloretone by the alkali catalyst precipitates on the surface of the hydroxide and tends to reduce the available surface of the catalyst to a point where Reaction 1 above is substantially reduced, if not completely suppressed. Hence, heretofore the practice has been to add sufficient caustic to overcome the reduced effective surface of catalyst. The overall effect has been a low yield of chloretone on the basis of chloroform consumed due to the increase of decomposition of chloretone according to Equation 2 above.

Heretofore, the amount of caustic added to the reaction mixture in the procedures followed for the manufacture of chloretone batchwise has been at least 0.3 mol per mol of chloroform added to the reaction mixture. Alcohol solvent for the caustic is conventionally used. I have found that excess catalyst in the form of caustic should be avoided. Amounts of sodium hydroxide or potassium hydroxide within the range of from about 0.01 mol to about 0.1 mol per mol of chloroform in the reaction mixture are sufficient. I prefer to use from about 0.02 to about 0.06 mol of sodium hydroxide or potassium hydroxide per mol of chloroform in the reaction zone, the caustic being added in the form of the aqueous solution.

In addition to the advantage of obtaining higher yields of hydrous chloretone per unit amount of chloroform consumed in the reaction when water is used as the solvent for the caustic, the use of water in my continuous process for making chloretone offers several additional advantages over the use of alcohol solvent. For example, when alcohol solvent is used, the problem of the formation and separation of ternary azeotropes is introduced and additional separation steps are made necessary in order to recycle the unreacted reactants substantially free of alcohol diluent.

In order to introduce to the reaction mixture the correct amount of caustic and water I adjust the concentration of the aqueous solution of caustic to a value such that the water added in the form of caustic solvent plus the small amount of water formed by the partial decomposition of chloretone product is within the range of from about 0.20 to about 2.0 mols of water per mol of chloretone product in said reaction mixture. I prefer to have present in the reaction mixture from about 0.4 mol to about 2.0 mols of water per mol of chloretone product. I have found that if the reaction is carried out with less than 0.2 mol of water per mol of chloretone product, substantially dry caustic must be used as catalyst. Since the yield of chloretone on the basis of chloroform consumed in the reaction and the conversion per pass are low when dry caustic is used, I prefer to use an aqueous solution of caustic as catalyst. I have also found that if more than about 2.0 mols of water per mol of chloretone product is present in the reaction mixture, the molten product consists of two phases, that is, an aqueous phase and a chloretone product phase. When it is desirable, as in my process, to separate the chloretone product from the reaction mixture by simple distillative fractionation, the presence of the aqueous phase is undesirable. On the other hand, if no more than 2.0 mols of water per mol of chloretone is present in the reaction mixture the molten product exists as a single liquid phase. A separate purification step may be avoided if the amount of water is held to a minimum, since water soluble metallic chloride contaminant is thereby substantially excluded. Thus, the added step of removal of excess water from the product is avoided, and the amount of equipment necessary for the continuous process is thereby reduced substantially and a purer product is formed. The use of relatively small amounts of caustic makes possible this feature of my invention, since larger amounts of caustic require more than the desired amount of water solvent in order to maintain the concentration of caustic alkali in the water within the most desirable range. I prefer to use aqueous caustic alkali solutions within the range of from about 15.0 to about 60.0 weight per cent caustic alkali in amounts to provide water and caustic in the reaction mixture within the above ranges.

Referring now to the drawing which represents diagrammatically one embodiment of my invention, chloroform in line 10 is continuously introduced to the acetone stream in line 11 in such an amount that the mol ratio of chloroform to acetone introduced to reactor 12 is about 1 to 5. Th acetone-chloroform solution is passed from line 11 by means of pump 13 in line 14 to precooler 15 where the temperature is lowered to the range of from about 0° to about −30° C. A prechilled coolant such as a brine solution is introduced to precooler 15 from line 20 and is circulated therefrom by means of pump 21 in line 22 through jacket 23 of reactor 12 in order to maintain the temperature of the reactants therein within the above range. The coolant passes from jacket 23 through line 24. At least a part of the brine is passed through line 25 to the brine cooling zone, not shown in the drawing, whence it is reintroduced to the process through line 20. The remainder of the brine is passed from line 24 through line 26 which joins line 20.

An aqueous solution of sodium hydroxide in line 30 is introduced to the acetone-chloroform solution in reactor 12 by means of pump 31 through spray nozzle 32. The amount of solution added should not be more than sufficient to furnsh 0.1 mol of NaOH per mol of chloroform in the reaction mixture, and not more than sufficient to furnish a maximum of 2.0 mols of water per mol of chloretone in the product. The preferred conversion per pass of chloroform to chloretone product is within the range of from about 20 to 40 per cent. Reactor 12 is provided with stirring means 33 and finely divided sodium chloride crystals separate in cloudlike form from the solution of catalyst in the reactants. The contact time in reactor 12 will usually lie within the range of from about 0.1 to 1.0 hour, or longer for the lower temperatures, to obtain a conversion of from about 20 to 40 per cent per pass of the chloroform and a yield of at least 85 per cent and preferably at least 90 per cent based on the chloroform consumed. The sodium hydroxide is substantially completely converted to sodium chloride by the reaction represented by Equation 2 above.

The reaction mixture containing the dissolved chloretone and suspended sodium chloride is passed by means of pump 34 in line 35 to separating means 36 which may be a centrifuge from which separated salt is withdrawn through line 37. The reaction mixture, substantially free of suspended salt, passes through line 38 to heater 39 and thence through line 40 to fractionator 45 which is equipped with reboiler means 46. In fractionator 45 unreacted acetone and unreacted chloroform, substantially completely in the form of the acetone-chloroform azeotrope are separated from the chloretone product. The unreacted reactants pass overhead through line 47, condenser 48, and line 49 to reflux accumulator 50. Condensate in accumulator 50 is withdrawn by means of pump 51 in line 52, a part thereof being passed through line 53 to be used as reflux in tower 45. The remainder of the condensate is passed via line 54 to line 14 as recycle reactant. If desired, a separation of substantially pure acetone from the acetone-chloroform azeotrope may be made in fractionator 45 in which case the azeotrope is separately recycled through line 56 which connects with line 14. Molten hydrous chloretone is withdrawn from tower 45 through bottom drawoff line 55. The product may be used without further purification for the production of methacrylic acid as described in the hereinabove mentioned Serial No. 657,900.

The following examples illustrate the advantage relative to yield of chloretone on the basis of chloroform consumed when using regulated, relatively small amounts of metallic hydroxide catalyst to convert a mixture of chloroform and acetone to chloretone.

*Example 1*

A mixture containing 290 grams (5 mols) of acetone and 119.5 grams (1 mol) of chloroform was chilled to a temperature of about 0° C. in a flask fitted with a stirrer. To the agitated chilled solution was added 2.5 cubic centimeters of a 50 per cent by weight aqueous solution of sodium hydroxide, (0.028 mol). Stirring of the mixture was continued and the reaction was complete in about 10 minutes. Sodium chloride crystals were filtered from the reaction mixture and the filtrate was evaporated. A yield of 53.1 grams of hydrous chloretone was obtained. This corresponds to 28.5 per cent of the theoretical yield of chloretone associated with about 0.5 mol of water per mol of chloretone, based on the chloroform charged. This yield corresponds to 95.2 per cent based on the chloroform consumed in the reaction. The total weight of sodium hydroxide added to the mixture was sufficient to react with 2.69 grams of chloretone product. Assuming that all of the sodium hydroxide reacted with a part of the chloretone, a total of 55.79 grams of the hydrous chloretone was formed with a loss of product by the reaction according to Equation 2 amounting to only about 4.8 per cent. About 70.0 per cent of the chloroform charged was recovered for recycle to the process. About 1.91 grams of water was added to the mixture in the form of sodium hydroxide solvent and an additional 0.57 gram of water was formed by the reaction of the 4.8 per cent of the chloretone, thus making available about 2.48 grams of water to form the hydrous chloretone. This approximates about 0.5 mol of water per mol of chloretone product recovered.

*Example 2*

A mixture consisting of 269 grams (4.6 mols) of acetone and 119.5 grams (1 mol) of chloroform was chilled to 0° C. and stirred rapidly while adding thereto 40 grams of a 50 per cent aqueous sodium hydroxide solution (0.50 mol). The reaction mixture was filtered to remove sodium chloride crystals and the filtrate was evaporated to a point where hydrous chloretone crystallized therefrom. The yield of air-dried product based on the chloroform charged was 66 grams or 35.4 per cent. The yield based on the chloroform consumed was only 68.0 per cent. The 20 grams of sodium hydroxide reacted with an additional 31.1 grams of chloretone product which represents a substantial loss of chloretone product and hence chloroform recycle. Only about 56.4 per cent of the chloroform charged was recovered for recycle to the conversion zone. The hydrous chloretone recovered contained about 3.2 grams of water. The reaction mixture contained a total of about 26.0 grams of water, that is, 20 grams added as sodium hydroxide solvent and 6 grams formed according to Reaction 2 above. This is several times the amount of water required by my preferred method of operation.

*Example 3*

33 grams (0.59 gram mol) of powdered KOH was added in small amounts to a solution of 50 grams (0.86 mol) of acetone in 100 grams (0.84 gram mol) of chloroform to form a reaction mixture containing approximately 0.7 mol of KOH per mol of chloroform. The mixture was chilled to a temperature below 0° C., thoroughly agitated, and then allowed to stand at a temperature of about 0° C. for 24 hours. The mixture was then filtered and the filtrate was distilled. The fraction boiling within the range of 165° C.–175° C. was poured into an equal amount of water to precipitate the chloretone. The precipitated chloretone was filtered and recrystallized from an ethanol-water mixture and air-dried. The yield of chloretone product was 6 grams, that is, somewhat less than 4 per cent of the theoretical yield based on the chloroform charged. When calculated on the basis of chloroform consumed the yield was about 15 per cent.

The following experiment illustrates the difficulty in using an alcoholic solution of potassium hydroxide as a catalyst for the continuous production of chloretone.

*Example 4*

A mixture of 86 gram mols (6300 milliliters) of acetone and 17 gram mols (1345 milliliters) of chloroform was cooled to 10° C. in a glass reactor fitted with a stirrer and a copper cooling coil. To the agitated cold mixture was added over a two-hour period 750 milliliters of a 1N-solution of potassium hydroxide in methanol. This corresponds to about 0.044 mol of KOH per mol of chloroform in the mixture. Potassium chloride separated from the mixture. At the end of the two-hour period the flask was fitted with a Kjeldahl head and 7460 milliliters of acetone, methanol, and chloroform were recovered as distillate. Ice water was added to the residue and the precipitated chloretone was filtered and dried. The yield was 588 grams or 18.5 per cent based on the chloroform charged. The composition of the distillate was determined by density determinations and a sufficient amount of make-up chloroform was added to make up a recycle stock which was identical with the initial composition except for the recycle methanol. The above procedure was repeated with this recycle stock. A yield of only 216 grams of chloretone was obtained, that is, about 10.7 per cent based on the chloroform charged.

Methanol apparently had an adverse effect on the reaction of acetone with chloroform. It is difficult to separate the methanol by fractionation from recycle acetone and chloroform due to ternary azeotrope formation with these components. The same is true of ethyl alcohol and hence I prefer to use water as the solvent for the caustic soda or caustic potash catalyst.

I may also use aqueous solutions of hydroxides of other metals of group I of the periodic table such as lithium hydroxide, rubidium hydroxide, or caesium hydroxide as catalysts for the reaction. However, I prefer to use aqueous solutions of sodium hydroxide.

My invention represents a definite improvement in the art of producing chloretone in that it makes possible a continuous process wherein improved yields of chloretone are obtainable. The use of aqueous sodium hydroxide catalyst in small amounts only, reduces the extent to which the chloretone product is decomposed. The separation of acetone and chloroform recycle from the product is facilitated by obtaining the hydrous chloretone as a molten single phase product in a single fractionation step.

I claim:

1. The continuous process for the manufacture of hydrous chloretone from acetone, chloroform, and water which comprises the steps of (1) continuously reacting in a conversion zone at a temperature within the range of from about +10° C. to about −40° C. a mixture of acetone and chloroform containing from about 3.0 to about 8.0 mols of acetone per mol of chloroform in the presence of a quantity of aqueous solution of a catalyst consisting of an hydroxide of a metal of the left-hand series of group I of the periodic table sufficient to provide from about 0.01 mol to about 0.10 mol of said hydroxide per mol of chloroform in said mixture to form a reaction mixture comprising hydrous chloretone, unreacted acetone, unreacted chloroform, and metallic chloride suspended therein, (2) continuously separating said metallic chloride from the mixture of acetone, chloroform, and hydrous chloretone of step 1, (3) continuously fractionating the mixture of acetone, chloroform, and hydrous chloretone, (4) continuously recycling acetone and chloroform from step 3 to step 1, and (5) recovering hydrous chloretone from step 3 of the process.

2. The continuous process for the manufacture of hydrous chloretone from acetone, chloroform, and water which comprises the steps of (1) continuously introducing a mixture of chloroform and acetone containing from about 3 to about 8 mols of acetone per mol of chloroform into a reaction zone at a temperature within the range of from about +10° C. to about −40° C., (2) continuously adding to said mixture in said reaction zone water and sodium hydroxide in the form of an aqueous solution in an amount sufficient to provide from about 0.01 mol to about 0.1 mol of sodium hydroxide per mol of chloroform introduced therein to convert from about 20 to about 40 per cent of said chloroform to hydrous chloretone, the amount of water in said solution of said sodium hydroxide being sufficient to provide at least 0.20 mol and not more than 2.0 mols of water per mol of chloretone product in said mixture, (3) continuously fractionating the product of step 2 to separate hydrous chloretone from unreacted acetone and unreacted chloroform, (4) recycling acetone and chloroform from step 3 to step 1, and (5) continuously recovering said hydrous chloretone from step 3 of the process.

3. The continuous process for the manufacture of hydrous chloretone from acetone, chloroform, and water which comprises the steps of (1) continuously contacting in a reaction zone a mixture of acetone and chloroform containing from about 3 to about 8 mols of acetone per mol of chloroform at a temperature within the range of from about 0° C. to about −30° C. with a cataylst consisting of an aqueous solution of sodium hydroxide in an amount sufficient to provide from about 0.02 to about 0.06 mol of sodium hydroxide per mol of chloroform in said mixture to convert from about 20 to about 40 per cent of said chloroform to hydrous chloretone, (2) continuously fractionating the product mixture of step 1 to separate hydrous chloretone from unreacted acetone and unreacted chloroform, and to separate from the mixture any sodium chloride formed by the reaction of said sodium hydroxide with a part of the chloretone product in said reaction mixture, (3) continuously recycling the acetone and chloroform obtained in step 2 to step 1, and (4) recovering the hydrous chloretone product from step 2 of the process.

4. The process as described in claim 3 wherein the water in the aqueous solution of sodium hydroxide is adjusted to an amount such that when combined with the water formed by the reaction of the sodium hydroxide with a part of the chloretone product there is provided in said reaction zone approximately one-half mol of water per mol of chloretone remaining in the product mixture.

5. In the process of manufacturing a chloretone product consisting substantially of chloretone associated with water by contacting chloroform and acetone reactants in a reaction zone with a caustic alkali cataylst, the improvement which comprises contacting said reactants in the proportion of from about 3 to about 8 mols of acetone per mol of chloroform with said caustic alkali catalyst in the form of an aqueous solution of said catalyst in an amount sufficient to furnish from 0.01 mol to 0.1 mol of caustic alkali per mol of chloroform reactant at a temperature within the range of from about −10° C. to −40° C. for a sufficient time to convert from about 20 per cent to about 40 per cent of said chloroform whereby a high yield of chloretone product based on the chloroform converted may be recovered from the reaction product of said reaction zone.

6. The continuous process for the manufacture of hydrous chloretone consisting of a single phase molten mixture of chloretone and water from acetone, chloroform, and water which comprises the steps of (1) continuously reacting in a conversion zone at a temperature within the range of from about +10° C. to about −40° C. a mixture of chloroform and acetone containing from about 3.0 to about 8.0 mols of acetone per mol of chloroform in the presence of a quantity of aqueous solution of a catalyst consisting of an hydroxide of a metal of the left-hand series of group I of the periodic table sufficient to provide from about 0.01 mol to about 0.10 mol of said hydroxide per mol of chloroform in said mixture, to form a reaction mixture comprising hydrous chloretone, unreacted acetone, unreacted chloroform, and metallic chloride suspended therein, (2) continuously separating said metallic chloride from the mixture of acetone, chloroform, and hydrous chloretone of step 1, (3) continuously fractionating the mixture of acetone, chloroform, and hydrous chloretone, (4) continuously recycling acetone and chloroform from step 3 to step 1, and (5) recovering the single phase liquid hydrous chloretone from step 3 of the process.

7. The continuous process for the manufacture of hydrous chloretone from acetone, chloroform, and water which comprises the steps of (1) continuously introducing a mixture of chloroform and acetone containing from about 3 to about 8 mols of acetone per mol of chloroform into a reaction zone at a temperature within the range of from about +10° C. to about −40° C., (2) continuously adding to said mixture in said reaction zone an aqueous solution of sodium hydroxide containing from about 15 per cent to about 60 per cent by weight of sodium hydroxide in an amount sufficient to provide from about 0.01 mol to about 0.1 mol of sodium hydroxide per mol of chloroform introduced therein to convert from about 20 to about 40 per cent of said chloroform to hydrous chloretone, (3) continuously fractionating the product of step 2 to separate hydrous chloretone from unreacted acetone and unreacted chloroform, (4) recycling acetone and chloroform from step 3 to step 1, and (5) continuously recovering said hydrous chloretone from step 3 of the process.

8. The continuous process for the manufacture of hydrous chloretone from acetone, chloroform, and water which comprises the steps of (1) continuously introducing a mixture of chloroform and acetone containing from about 3 to about 8 mols of acetone per mol of chloroform into a reaction zone at a temperature within the range of from about +10° C. to about −40° C., (2) continuously adding to said mixture in said reaction zone water and sodium hydroxide in the form of an aqueous solution in an amount sufficient to provide from about 0.01 mol to about 0.1 mol of sodium hydroxide per mol of chloroform introduced therein, (3) continuously fractionating the product of step 2 to separate hydrous chloretone from unreacted acetone and unreacted chloroform, (4) recycling acetone and chloroform from step 3 to step 1, and (5) continuously recovering said hydrous chloretone from step 3 of the process.

GEORGE A. HARRINGTON.

REFERENCES CITED

The following references are of record in the file of this patent:

Sah et al., Chemical Abstracts, vol. 26, page 5907, (1932).